US010235486B2

(12) United States Patent
Srinivasan et al.

(10) Patent No.: US 10,235,486 B2
(45) Date of Patent: Mar. 19, 2019

(54) METHOD, APPARATUS AND SYSTEM FOR AUTOMATICALLY DERIVING PARAMETERS FOR AN INTERCONNECT (71) Applicant: Intel Corporation, Santa Clara, CA (US)

(72) Inventors: Krishnan Srinivasan, San Jose, CA (US); Robert P. Adler, Santa Clara, CA (US); Robert De Gruijl, San Francisco, CA (US); Jay Tomlinson, San Jose, CA (US); Eric A. Geisler, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 15/279,725

(22) Filed: Sep. 29, 2016

(65) Prior Publication Data
US 2018/0089342 A1 Mar. 29, 2018

(51) Int. Cl.
*G06F 17/50* (2006.01)
(52) U.S. Cl.
CPC ........ *G06F 17/505* (2013.01); *G06F 17/5077* (2013.01); *G06F 2217/68* (2013.01)
(58) Field of Classification Search
USPC ........................................ 716/104, 118, 137
See application file for complete search history.

(56) References Cited

U.S. PATENT DOCUMENTS

| 8,216,071 B2 * | 7/2012 | Lee ..................... A63F 13/12 463/42 |
| 9,183,337 B1 | 11/2015 | Nagpal et al. |
| 2006/0192579 A1 * | 8/2006 | Jacobsen ............ G01R 31/2801 716/137 |
| 2008/0288906 A1 * | 11/2008 | Kopischke .......... G06F 17/5068 716/118 |
| 2013/0051385 A1 * | 2/2013 | Jayasimha .............. H04L 45/00 370/389 |
| 2013/0262809 A1 * | 10/2013 | Wegener ................. G06F 12/08 711/165 |

(Continued)

FOREIGN PATENT DOCUMENTS

WO 2016099812 6/2016

OTHER PUBLICATIONS

Sonics, Inc., "SonicsStudio Director, Product Brief," Nov. 2015, 2 pages.

(Continued)

*Primary Examiner* — Brian Ngo
(74) *Attorney, Agent, or Firm* — Trop, Pruner & Hu, P.C.

(57) ABSTRACT

In one embodiment, a design tool for designing a system on chip (SoC) includes hardware logic to generate one or more configuration files for a fabric of a SoC to be designed by the design tool. This logic is configured, based at least in part on user input, to generate the one or more configuration files, according to at least one of: automatic derivation of all parameters of the fabric, according to a first user selection; manual input by a user of at least some parameters of the fabric and automatic derivation of at least other parameters of the fabric, according to a second user selection; and manual input by the user of the all parameters of the fabric, according to a third user selection. Other embodiments are described and claimed.

14 Claims, 7 Drawing Sheets

(56) References Cited

U.S. PATENT DOCUMENTS

| | | |
|---|---|---|
| 2013/0268905 A1 | 10/2013 | Pandey et al. |
| 2014/0298281 A1 | 10/2014 | Varadarajan et al. |
| 2015/0379176 A1 | 12/2015 | Nayak et al. |
| 2016/0179161 A1 | 6/2016 | Adler et al. |
| 2016/0180001 A1 | 6/2016 | Adler |

OTHER PUBLICATIONS

Sonics, Inc., "SonicsLX On-Chip Network, Product Brief," Nov. 2015, 2 pages.

U.S. Appl. No. 14/880,443, filed Oct. 12, 2015, entitled "Providing Multiple Roots in a Semiconductor Device," by Michael T. Klinglesmith, et al.

U.S. Appl. No. 14/865,005, filed Sep. 25, 2015, entitled "Handling a Partition Reset in a Multi-Root System," by Michael T. Klinglesmith, et al.

International Searching Authority, "Notification of Transmittal of the International Search Report and the Written Opinion of the International Searching Authority," dated Dec. 13, 2017, in International application No. PCT/US2017/49727.

* cited by examiner

METHOD, APPARATUS AND SYSTEM FOR AUTOMATICALLY DERIVING PARAMETERS FOR AN INTERCONNECT

TECHNICAL FIELD

This disclosure pertains to computing system, and in particular (but not exclusively) to system design tools.

BACKGROUND

Advances in semiconductor processing and logic design have permitted an increase in the amount of logic that may be present on integrated circuits. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically includes one or more semiconductor die, where the die may include any number of cores, hardware threads, logical processors, interfaces, memory, controller hubs, etc. While semiconductor devices include ever-increasing amounts of capabilities and circuitry, design techniques have not kept up. Many portions of an integrated circuit design are implemented manually by designers, which unnecessarily consumes time, resources and leads to potential errors. While some automation via design tools is available, there are limitations.

DETAILED DESCRIPTION

In various embodiments, an integrated circuit design tool may be used to enable creation of highly automated configuration files for use in developing integrated circuits. As described herein, such design tool may be used to generate configuration files for a variety of processors, system on chips (SoCs) and other integrated circuits (ICs). In particular embodiments described herein, these configuration files may be for interconnect structures of an SoC that leverage the design tool to easily and flexibly generate a configuration that incorporates a wide variety of potentially configurable parameters, greatly reducing burden on designers. Still further, embodiments of the design tool enable this highly automated configuration process to further allow great user flexibility to enable the user to select configuration parameters themselves for certain features or classes of features.

In embodiments, a representative fabric designed as described herein is an on-chip interconnect for use in platform control hubs (PCHs), processors and other SoC designs. In order to configure an interconnect such as a primary scalable fabric (PSF), an average of 5,000 parameters and a worst case of 50,000 parameters have to properly configured on each PSF instance in a topology. Many device topologies include a minimum of 3 PSF instantiations. Without an embodiment, these parameters are set manually and propagated across PSF instances manually. Setting parameters manually is not only tedious and time consuming, but also error prone. Some errors in such manual operations are debugged at simulation time, causing considerable delays in realizing a functionally working fabric.

In various embodiments, a user can represent a configuration of a PSF network at an abstracted level, enabling a vast reduction in the number of inputs to configure a PSF network. Embodiments enable novice users (such as junior designers or engineers) to specify the minimal required input, while still allowing an expert user (such as a more senior designer or engineer) to specify all details of a PSF configuration. In all cases, any unspecified details are derived by automation software (DAC). Since the input requirements can be so few, and because the configured interconnect is correct by construction, embodiments enable considerable reductions in the time to configure a PSF network. For example, with an embodiment PSF configuration time can be reduced from weeks to hours and is practical for non-expert users. Also, last minute features of a design can be added or removed easily.

Figure 1:
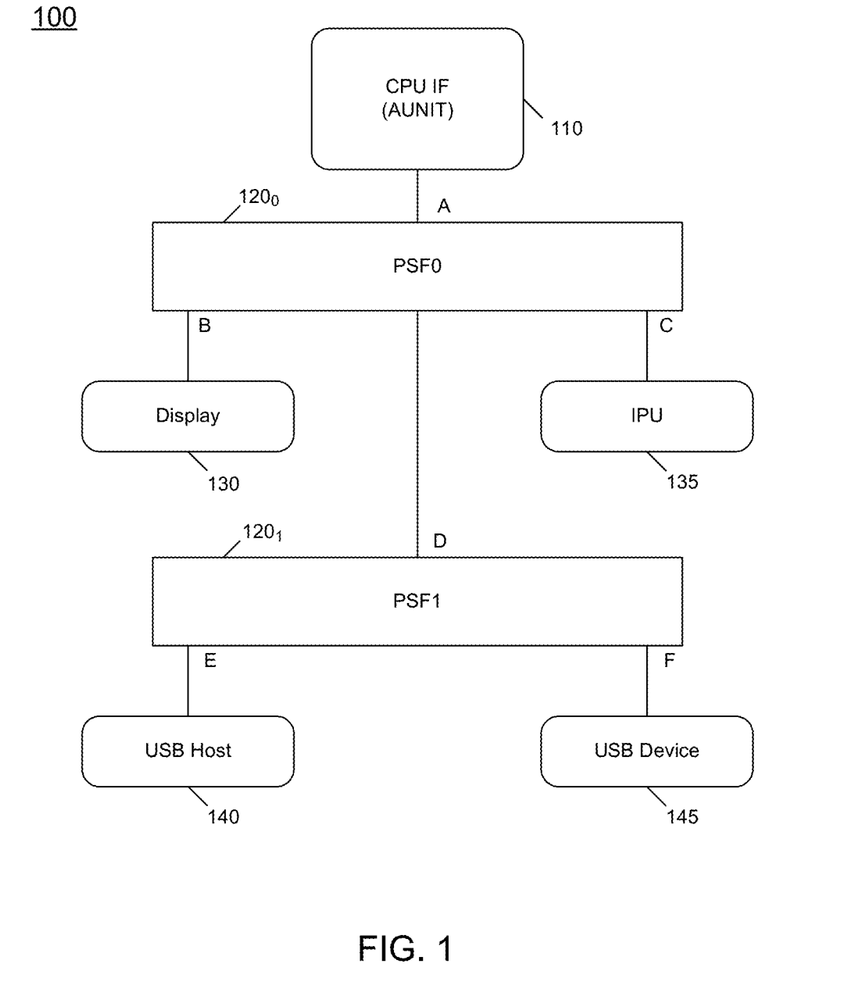
FIG. 1 is a block diagram of a SoC in accordance with an embodiment of the present invention.

To understand the context in which highly automated fabric design techniques may be used, it is instructive to illustrate a representative SoC or other processor, the design of which may leverage embodiments as described herein. Referring now to FIG. 1, shown is a block diagram of an SoC in accordance with an embodiment of the present invention. In FIG. 1, SoC 100 is shown at a high level and illustrates various components that may be present on a single semiconductor die, e.g., as implemented in a given IC. As seen, SoC 100 includes a CPU interface 110. CPU interface 110, also referred to herein as an AUNIT, may provide an interface to main central processing unit (CPU) circuitry of the SoC, which may be realized by a plurality of homogeneous or heterogeneous cores. In some embodiments CPU interface 110 may be implemented as a coherent interconnect to such cores. In turn, CPU interface 110 couples to a first fabric $120_0$, which is a first instantiation of a PSF. In embodiments, the PSF may be an integrated on-chip scalable fabric (IOSF), which may be designed according to a given specification provided by a semiconductor manufacturer to provide a standardized on-die interconnect protocol for attaching intellectual property (IP) blocks within a chip. More specifically as seen, CPU interface 110 couples to fabric $120_0$ via a first port A of fabric $120_0$.

As further illustrated in FIG. 1, on a downstream side, fabric $120_0$ couples to multiple independent intellectual property blocks (generically referred to herein as IP logics) 130 and 135. More specifically, a display controller 130 couples to fabric $120_0$ via another port B of fabric $120_0$, while an image processing unit (IPU) 135 couples to fabric $120_0$ via another port C of fabric $120_0$.

To provide interconnection to additional on-chip components, fabric $120_0$ further couples to another fabric $120_1$, which is another instantiation of a primary scalable fabric. More specifically, fabric $120_1$ is coupled to fabric $120_0$ via a port D of fabric $120_1$. In turn, multiple additional IP blocks, namely a USB host 140 couples to fabric $120_1$ via a port E, and a USB device 145 couples to fabric $120_1$ via another port F. Understand that these different IP logics all may be designed by a single SoC designer (which may also be a manufacturer of the SoC). In other cases, one or more of the IP blocks may be a third party IP logic provided for incorporation into a given SoC. Note that in FIG. 1, each of the IP blocks and scalable fabrics has a given name. As described herein, these names may be used within configuration files to identify particular features within the design. Understand while shown with this representative implementation for ease of discussion, embodiments apply to many different types of IC designs that incorporate one or more scalable on-chip interconnects or other interconnect structures.

Figure 2:
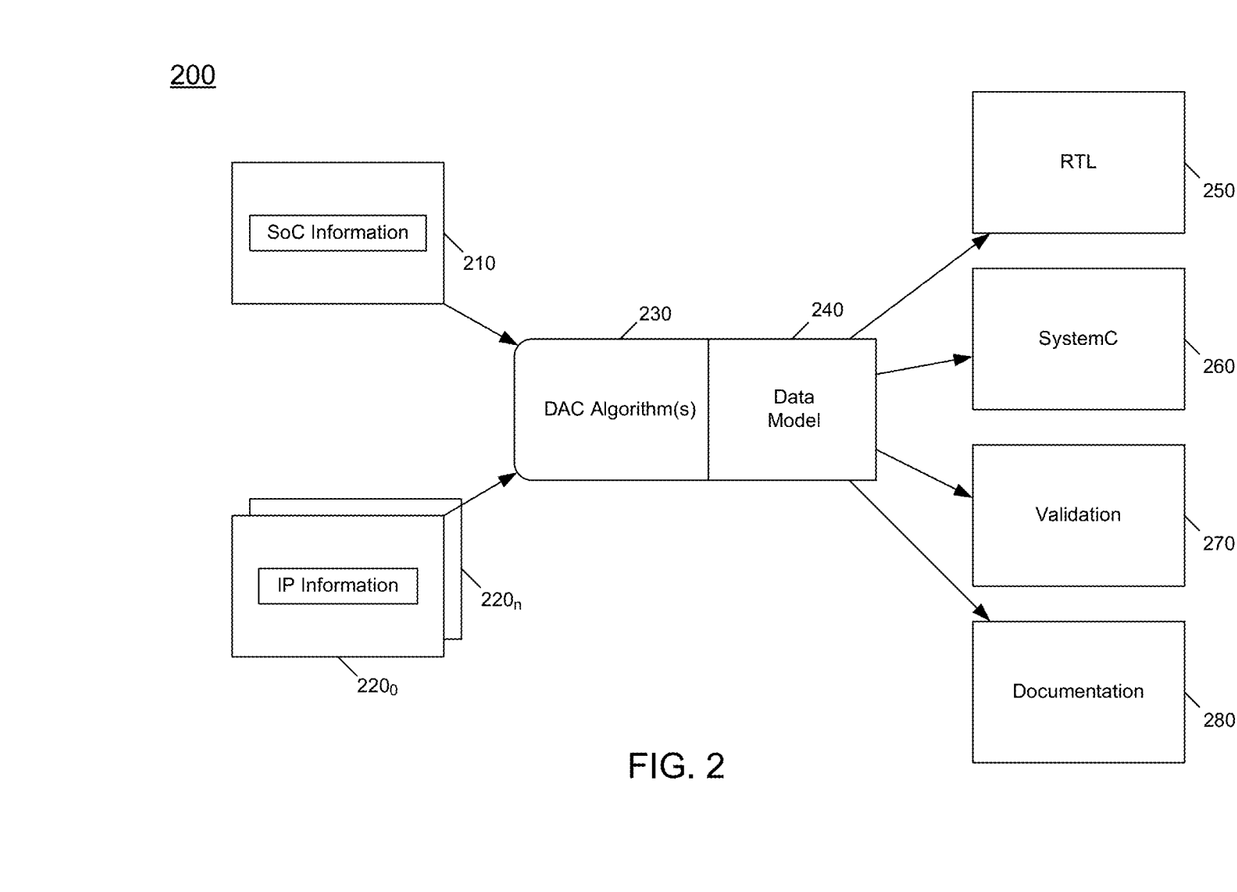
FIG. 2 is a block diagram of a design infrastructure in accordance with an embodiment.

Referring now to FIG. 2, shown is a block diagram of a design infrastructure in accordance with an embodiment. As shown in FIG. 2, design infrastructure 200, which may be implemented as a SoC design tool instantiated in one or more computer systems such as a collection of one or more server computers, provides for creation of an internal data model 240. This data model may be generated as described herein according to a range of options between a fully autonomous design and a fully user configurable design. To generate this model, a variety of different information can be used and processed by the design tool in order to form a data model, which may then be implemented in selective one or more of a wide variety of different file formats. To this end, the incoming information may include SoC information 210, which as will be described herein includes a system file, a topology file and a mapping file. In an embodiment, the system file may include information regarding a plurality of clocks available in a design. Such clock-based information may include names for the multiple clocks, frequencies, guardbands, among other such information. In an embodiment, the mapping file may include information regarding a mapping of IP meta files with the names of the corresponding IP logics. In an embodiment, the topology file may describe the requirements of the fabric. Such information may include a wide variety of features, including number of ports, buffer sizes, number of channels, mapping of channels and credit information, among large amounts of other such information. In an embodiment, this information includes topology information and end-to-end channel mapping. In addition, optional information can be provided regarding a wide variety of features (e.g., buffer sizes, credit information, detailed channel mapping on each PSF, etc.). Additional incoming information includes IP information. As illustrated in FIG. 2, this IP information may take the form of a plurality of IP meta files $220_0$-$220_n$, where each such IP meta file is associated with an IP logic to be implemented within the SoC.

This information is provided to one or more DAC algorithms 230 of a set of derivation algorithms. Depending upon a desired amount of user input (ranging from every possible configurable parameter to be provided by user or zero (minimal set) of such inputs), one or more DAC algorithms 230 may operate to generate a data model 240. Note that data model 240 may be a single model that captures all parameters of a design, such as a fabric design as described herein. In embodiments, this data model may be formed in a JavaScript Object Notation (JSON) type of format. From this data model format, any of a plurality of desired types of output formats can be provided. As illustrated in FIG. 2, these output formats include an RTL configuration format 250, a SystemC model configuration file 260, a validation file 270, which may be provided in a SystemVerilog format, and a documentation file 280, which in an embodiment may be in an extended markup language (XML) or portable document format (PDF) arrangement. Understand while shown at this high level in FIG. 2, additional inputs and control mechanisms are possible.

Figure 3:
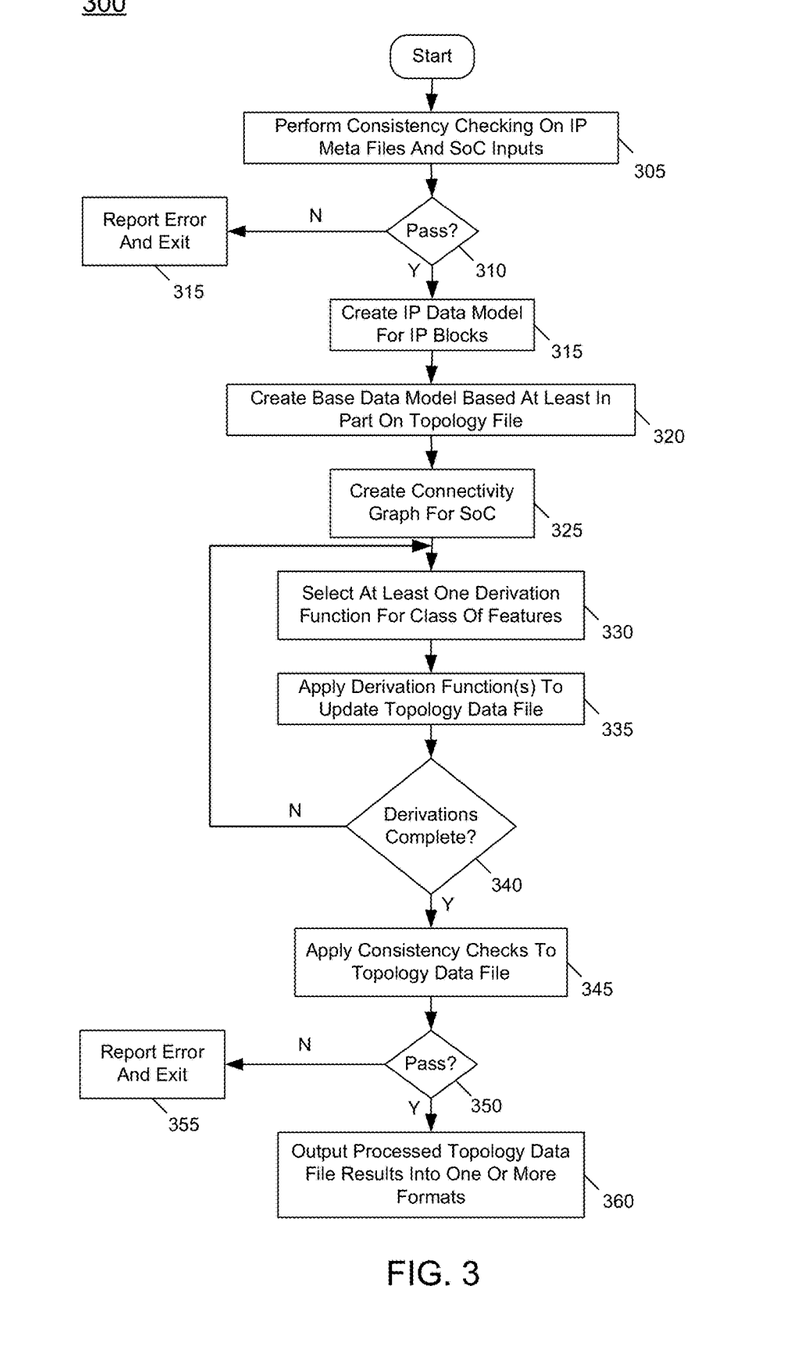
FIG. 3 is a flow diagram of a method in accordance with an embodiment of the present invention.

Referring now to FIG. 3, shown is a flow diagram of a method in accordance with an embodiment of the present invention. More specifically, method 300 is a method for operating a design tool adapted to generate a configuration file for one or more primary scalable fabrics of a SoC or other IC design. In different implementations, method 300 may be performed by hardware, software and/or firmware or combinations thereof. For example, a design tool may implement a collection of one or more software applications, may execute on one or more computing systems such as one or more server computers.

As illustrated, method 300 begins at block 305 by performing consistency checks on incoming information. More specifically, this incoming information may include a set of SoC inputs and a set of IP meta files, where a given IP meta file is provide for each independent IP logic within the SoC.

In an embodiment, the consistency checking performed may include both syntactic and semantic consistency checks to ensure that both the IP meta files and the SoC inputs are syntactically and semantically correct. For example, the checks may include ensuring that various information within these files such as naming conventions, configuration parameters and so forth are correct and/or are within acceptable thresholds for a particular design. Additional consistency checks may include checking that if a port is defined, there is a channel map for this port, and vice versa.

At the conclusion of such consistency checks, it can be determined whether all the checks have passed (diamond 310). If not, an error may be reported and the operation of generating a data file may exit unsuccessfully.

Still with reference to FIG. 3, instead if all such checks pass, control passes to block 315 where an IP data model may be created for the IP blocks. More specifically an IP data model may be created for each IP block in the design. The IP data model includes interface specific information of the IP logic. For an IOSF logic, this can include the delay from receiving a grant from the interconnect to issuance of the command, optional IOSF signals, details about transactions that the IP logic can receive (read, write, etc.), and details about the transactions that the IP logic can send.

Control next passes to block 320 where a base data model may be created. More specifically, this base data model may be created based at least in part on a topology file, which is part of the SoC input information. In an embodiment, this base data model may include a pointer for each IP data model. Such pointer may correspond to a name of the given IP meta file, in an embodiment. Thereafter, control passes to block 325 where a connectivity graph for the SoC may be created. In embodiments, a system-level input is provided and used to create an internal data model. In an embodiment, this data model is a graph data structure, with specific properties attached to nodes and edges. In one embodiment, a shortest path algorithm may be used to create a graph so that there is a unique path for each connection specified in the topology file. As an example in this connection graph, each port of the fabric can be enumerated as a node and corresponding edges are used to connect such node to a given IP block to which the port or node is connected. To this end, application programming interfaces (APIs) may be created to ensure that only legal paths in the graph are traversed at any point in derivation operations.

Still referring to FIG. 3, next a loop of iterations may be performed to derive a plurality of classes of features for the fabric. In this way, the data model is then progressively refined, where each refinement includes deriving a class of parameters for configuring a PSF instance. Although the scope of the present invention is not limited in this regard, embodiments may be used to design a fabric having a large number of classes of features, e.g., between approximately 1 and 25 classes of features. Examples of feature classes may include buffer sizes, channel mappings, subtractive ports and so forth. These derivations may be used to update the topology data file.

As illustrated in FIG. 3, at least one derivation function may be selected for a given class of features (block 330). For each feature of the class of features, if the feature's derivation is explicitly disabled, no operation occurs. Otherwise, if the feature is already specified, the model may be updated with the specified features. Alternately, the feature may be derived. In an embodiment, the graph may be traversed and a specific formula of the feature may be applied on each node of the graph. Finally, the data model may be updated only where the feature has not already been specified.

Each refinement adheres to the following principle:

```
If derivation of this class of parameters is disabled {
    Use whatever is described in the input
} Else {
```

Apply a Specific Derivation Algorithm

Append the result to what is already specified in the input.

In effect, if the user does not specify anything for a given class, the derivation software derives all the parameters pertaining to the class. However, if the user specifies one or more parameters for a class, the derivation software derives the parameters that are not already specified. Finally, embodiments enable a user to completely disable any derivation for a specific class of parameters, and instead set all parameters manually.

Each option has its usage model. Enabling the derivation tool to set up all the parameters is useful in terms of letting the algorithm do all the work. When this option is chosen, the number of inputs into the derivation tool is low. In this way, an initial design can be formed, thereby enabling a configuration to be up and running fast. A second option is to set partial inputs, which may be useful when part of a design is set up and pre-verified. A further option in which all manual inputs are provided may be useful when a user wants the same result regardless of potential changes in derivation code over multiple revisions. This is already especially useful for 1.0 configurations, where changes have been already been finalized.

Still with reference to FIG. 3, at this point it is thus determined whether the derivations for the class of features is completed (at diamond 340). If all derivations for all classes of functions has been completed, control passes to block 345 where consistency checks may be applied to the topology data file. Such consistency checks may generally be performed as discussed above to ensure that improper configurations are not generated. If it is determined that the consistency checks are all valid (diamond 350), the processed topology data file may be output in one or more desired formats (block 360). As described above, a given data model can be output in one or more formats to enable a large variety of custom output writers including standard or custom RTL configuration formats, standard or custom SystemC model configuration files, documentation files or any other user-specified output.

Note that if one or more of the consistency checks fails as determined at diamond 350, control instead may pass to block 355 where the error may be reported and the design tool may be exited without providing a finalized processed topology data file. Understand while shown at this high level in the embodiment of FIG. 3, many variations and alternatives are possible.

Using an embodiment, an advanced user can override the specific configuration of any feature. In effect, derivation and user level overrides can co-exist. For example, the automation software may derive certain quality of service (QoS) values for the fabric. However, after performance analysis, an architect may want to fine tune these QoS values. To this end, embodiments enable a user to only update QoS parameters of interest to the user, and let the automation software derive the rest of the network. In addition, the capability of selectively overriding any parameter setting at a fine-grained level allows a user to easily set up certain aspects of the network with overrides and the rest with derivation.

As a representative example in a PSF network, buffered ports may be configured with explicit settings for buffer sizes (which can be implemented in an embodiment as first in first out (FIFO) buffers) for each of a set of different flows (e.g., posted, non-posted, completion) on each channel. An embodiment may provide three options for setting the buffer sizes. According to a default option, the buffer sizes may be set to a minimum size required to support the maximum payload size at the port. According to a performance option, the buffer size may be set based on the amount of traffic on the channel of the port. As another option, a user-specified option allows a user to specify the buffer size.

Table 1 shows an example PSF network having two PSF instances with ports annotated A-F. Assume that the user wishes to alter the buffer depth of just port D. Table 1 illustrates the buffer depths derived by each of the three options (default, performance and user-specified) to demonstrate how configuration choices made by the derivation tool can be overwritten by user input. Specifically as shown, with a user-specified input for port D, this value differs from that derived by the derivation tool.

TABLE 1

| Port | Default | Performance | User Specified |
| --- | --- | --- | --- |
| A | 16 | 48 | 48 |
| B | 16 | 16 | 16 |
| C | 16 | 16 | 16 |
| D | 16 | 48 | 80 |
| E | 16 | 16 | 16 |
| F | 16 | 16 | 16 |

Embodiments thus enable a design tool to configure a fabric or other interconnect in a manner that supports full automated derivation, partial automated derivation, and full manual override of all possible configurable parameters. As such, an interconnect having N parameters can be configured by allowing a user to set up all, some (e.g., M) or none of the N parameters, as desired. An interconnect derivation algorithm in accordance with an embodiment uses a single data model to generate a variety of output styles, including RTL, SystemC, validation and documentation. In addition, the design tool can receive inputs separately from input of connected IP data and create the interconnect.

By enabling a user to specify requirements at an abstracted level, multiple purposes are served. First, it reduces the number of inputs to be specified, thus reducing human error. Second, it reduces the time taken to configure the interconnect, which can dramatically reduce configuration times, e.g., from weeks to hours. In addition, selective user override of interconnect features allows a user, for example, to set up an interconnect for a 0.5/0.8 specification goal, and perform a QoS override late in the design cycle, e.g., to selectively change some buffer depths.

Using an embodiment, a process to configure an interconnect is quicker, and provides an iterative process where the interconnect can be generated multiple times, refining the interconnect over each iteration, while at the same time allowing advanced users to selectively override features of the auto-generation interconnect.

Figure 4:
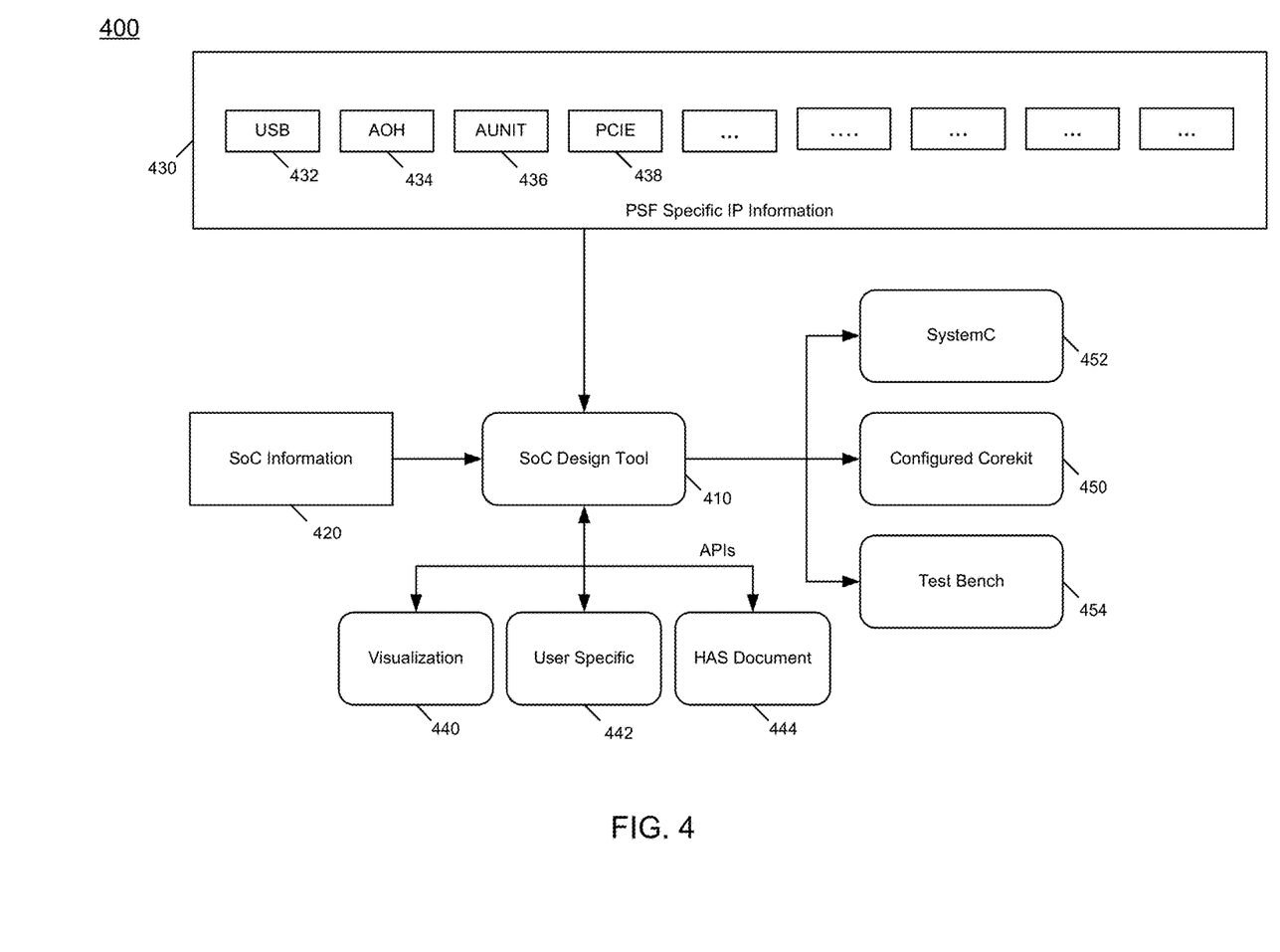
FIG. 4 is a block diagram of a design system arrangement in accordance with an embodiment.

Referring now to FIG. 4, shown is a block diagram of a design system arrangement in accordance with an embodiment. As shown in FIG. 4, system 400 is a design environment in which a SoC design tool 410 is present. As described above, such design tool 410 can be implemented as one or a number of computing systems, either located locally or coupled via remote connection. In an embodiment, SoC design tool 410 may include combinations of hardware, software and/or firmware, including a set of one or more processors (each of which may be implemented as multi-core processors), associated memories, storages, communication devices, display devices and so forth. In addition, design tool 410 may include various hardware configuration logic to perform automated configurations of all or portions of an SoC of interest. In specific embodiments described herein, such logic may include fabric configuration logic to automatically generate one or more fabrics, such as multiple primary scalable fabrics implemented on a SoC.

To this end, SoC design tool 410 is coupled to receive SoC information 420 and IP information 430. SoC information 420 may include connectivity information (e.g., including information regarding connectivity of a set of IP devices to couple to a PSF network, channel mapping for ports of the PSF (and coupled devices), among other such information). In turn, IP information 430 may include PSF-specific IP information, which may be supplied by third party vendors, in instances in which a given IP logic is provided by such third party.

As illustrated, for a particular SoC design, PSF-specific IP information may be provided for a plurality of different IP logics, including a USB device 432, an AOH 434, an AUNIT 436, and a PCIe device 438. Of course many other devices may be included in a SoC, with corresponding PSF-specific IP information provided for such devices. With an embodiment as described herein, significant responsibility may shift to IP vendors to provide IP information that may be fixed for a given SoC design. And, when a given IP meta file is provided, it may be useable for designing a wide variety of SoCs, easing design processes both for third party IP vendors and SoC manufacturers.

As further illustrated in FIG. 4, a user may interact with SoC design tool 410 via a variety of application programming interfaces (APIs), including a visualization API 440, a user-specific API 442, and an HAS document 444. Note that visualization tools, HAS documents, or other output formats such as a system Verilog-based verification tool can be written using the standard data model made visible by the DAC tool. Further, the algorithms themselves can be overridden by replacing a specific class of derivation with user defined code. The resulting outputs from SoC design tool 410 may include any of a desired number of representable formats, including a SystemC format 452, a configured core kit 450, which may be used for SoC integration, and a test bench implementation 454. Understand while shown at this high level in the embodiment of FIG. 4, many variations and alternatives are possible.

Figure 5:
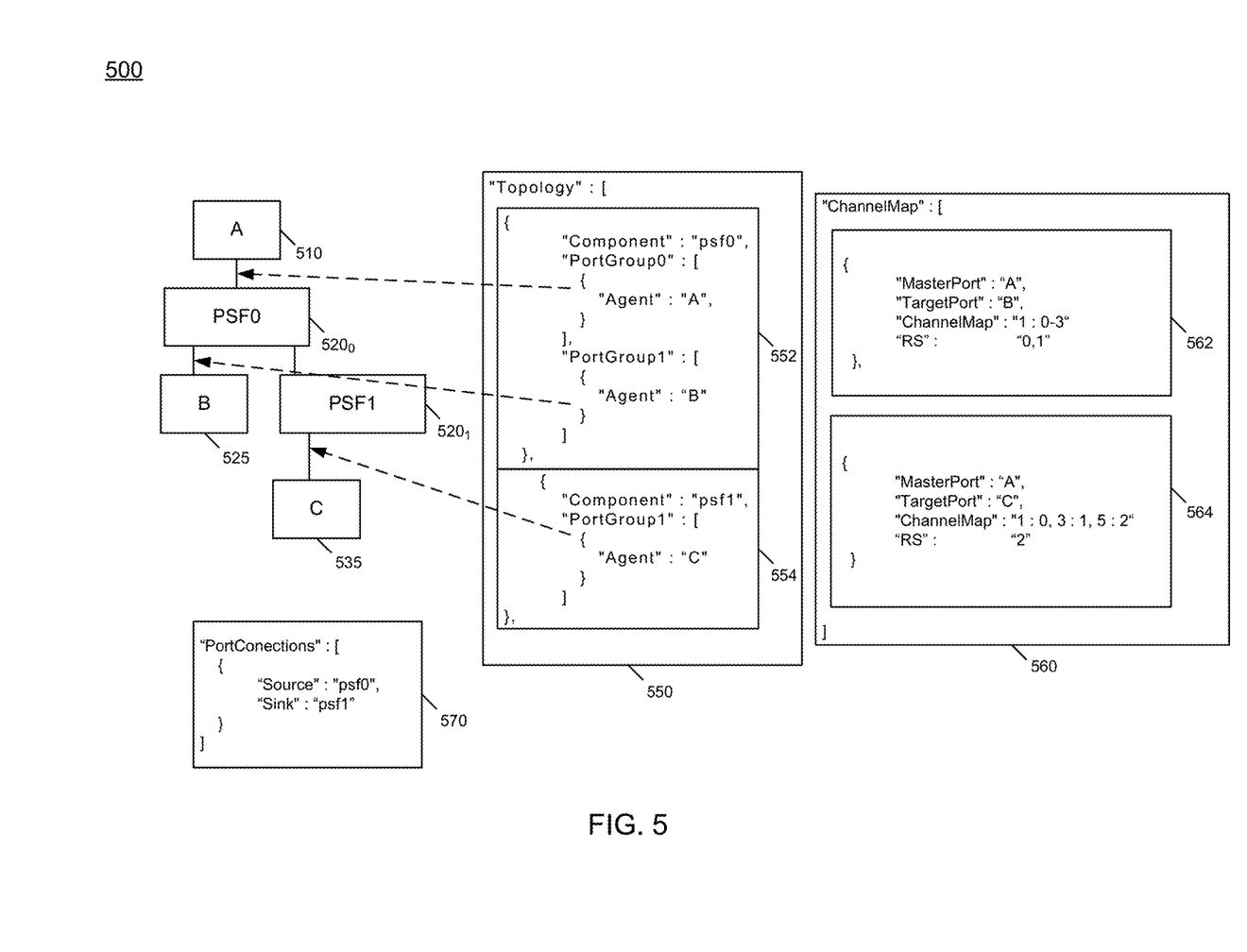
FIG. 5 is an illustration of interaction between a SoC design and topology information.

To further illustrate the interaction between a given SoC design and configuration information as described herein, reference can be made to FIG. 5, which is an illustration of interaction between a SoC design and topology information.

As seen, a SoC design 500 includes a first device 510 coupled to a first PSF (PSF0) $520_0$ via an upstream port. In turn, PSF $520_0$ couples via downstream ports to a device (B) 525 and a second PSF (PSF1) $520_1$. In turn, another device (C) 535 couples to a downstream port of PSF $520_1$.

As further illustrated in FIG. 5, topology information 550 includes individual topology information blocks 552 and 554 for each corresponding PSF 520. As illustrated, this topology information generally includes information regarding the components, ports and coupled agents with respect to these PSFs.

As further illustrated in FIG. 5, in an embodiment topology information may further include channel mapping information 562. As illustrated, channel mapping information 560 includes respective map metadata 562, 564 for mapping between communication paths with respect to devices 510, 525 and 510, 535. In the example channel mapping of mapping information 560, Channel 1 on Agent A (510) maps to all channels on Agent B (525), Channel 1 on A maps to Channel 0 on C, Channel 3 on A maps to Channel 1 on Agent C, and Channel 5 on A maps to Channel 2 on C. Note that channels on internal links may be derived, or users can override them. Finally, FIG. 5 also illustrates port connection information 570, which indicates that PSF $520_0$ is to act as a source with respect to PSF $520_1$, which is to act as a sink. Of course other configurations and additional information for such configurations are possible in other embodiments.

Figure 6:
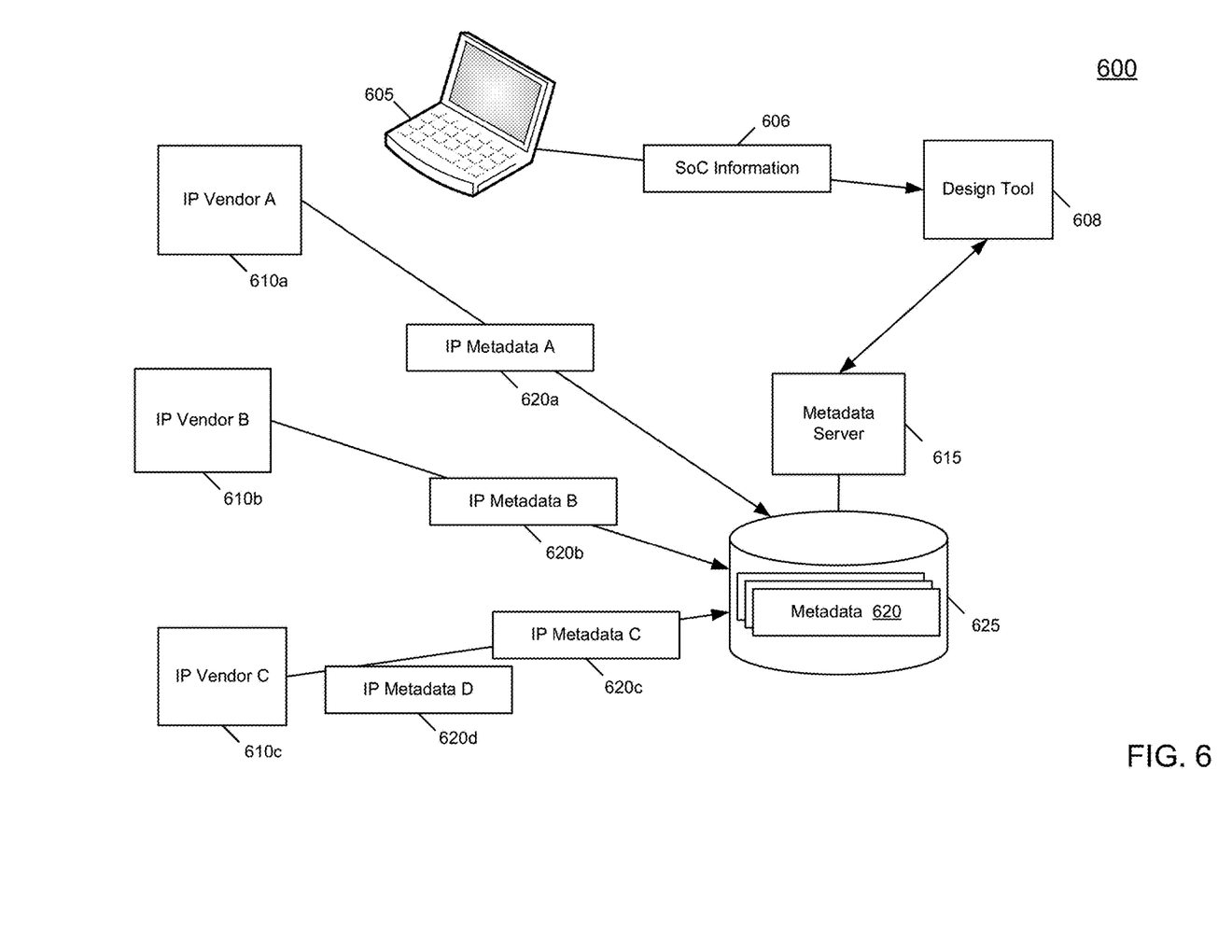
FIG. 6 is a block diagram of a system environment in accordance with an embodiment of the present invention.

Referring now to FIG. 6, shown is a block diagram of a system environment in accordance with an embodiment of the present invention. As shown in FIG. 6, system 600 may include a collection of different computing platforms coupled together in any type of network fashion. For example, some of the systems may be locally present in a given location such as a SoC vendor. In other cases, at least some of the systems may be resident at other locations, such as at enterprises of third party IP vendors that provide particular IP logics for incorporation into products of the SoC vendor. In the illustration of FIG. 6, a first system 605, which may be a server computer of the SoC designer, is used to provide SoC information 606 to a design tool 608.

As described herein, design tool 608 may be any type of computing system, such as a server computer. In addition to receipt of SoC information 606, design tool 608 further may receive IP metadata from various sources. In the illustration, these sources include a plurality of IP vendors 610a-610c which in turn may communicate corresponding IP metadata files 620a-620d. Note that at least one of the IP vendors can provide multiple IP metadata files. In embodiments, each individual IP metadata file 620 may provide configuration and other information for a particular IP logic to be incorporated into a SoC design. As illustrated, these files may be stored in a storage 625, such as a metadata storage, which may store the information to enable access by design tool 608 during configuration operations as described herein. To this end, design tool 608 may interact with a metadata server 615 that in turn couples to metadata storage 625.

As such, design tool 608, based upon the received information and user input regarding any type of overriding information to occur for particular classes of features, may generate a design abstraction of the SoC or portions thereof, including fabrics such as the PSFs described herein. Based on the received information, this design abstraction can identify details regarding the fabric and its interconnection to the IP blocks including features such as port location, port sizes, buffer sizes, virtual channels, transaction sizes, bus widths, among other such information. Also derived are parameters that determine how multiple PSF instances interoperate. In embodiments, channel maps on each PSF may be derived such that overall connectivity requirements are satisfied, subtractive ports are derived so that each transaction can be routed to a subtractive endpoint, and decoders at each PSF may also be derived. Understand while illustrated at this high level in the embodiment of FIG. 6, many variations and alternatives of a design environment are possible.

Referring now to Table 2, shown is an example, non-limiting representation of SoC information as described herein. More specifically, the SoC system information shown in Table 2 includes clock-based information, including names of clocks, various frequencies, guard bands and other control parameters for multiple clocks that may be implemented within a SoC.

TABLE 2

```
{
    "Clock": [
        {
            "ClockName": "clk700_clk",
            "ClockValue": "700,120",
            "GuardBand": "30",
            "InputDelay": "70",
            "OutputDelay": "70",
            "Reset": "clk700_clk_rst",
            "ResetDeAssertDelay": "10"
        },
        {
            "ClockName": "clk175_clk",
            "ClockValue": "175,120",
            "GuardBand": "30",
            "InputDelay": "70",
            "OutputDelay": "70",
            "Reset": "clk175_clk_rst",
            "ResetDeAssertDelay": "10"
        },
        {
            "ClockName": "sb_clk",
            "ClockValue": "266,266",
            "GuardBand": "31",
            "InputDelay": "70",
            "OutputDelay": "70",
            "ResetDeAssertDelay": "10",
            "Reset": "sb_clk_rst"
        }
    ]
}
```

Referring now to Table 3, shown is an example, non-limiting representation of information present in an IP metadata file in accordance with an embodiment. Understand that while a limited amount of information is illustrated in Table 3 for purposes of example, much more information may be present in a particular IP meta file. As seen in Table 3, IP metadata may include channel-based information such as configuration parameters for data communicated via a channel. In addition, IP metadata may further include configuration information for addressing of the IP logic, messaging parameters, various configuration properties of the IP logic, its capabilities and so forth.

TABLE 3

```
{
    "CHANNEL_DATA": [
        {
            "CHANNEL": {
                "DESCRIPTION": "Set up the channel for which
                max payload values are to be set",
                "RANGE": "0:15",
                "REQUIRED": "1",
                "TYPE": "INTEGER",
                "VALUE": "0"
            },
```

TABLE 3-continued

```
            "DRIVES_MAX_PAYLOAD_C": {
                "DESCRIPTION": [
                    "The maximum number of DWORDS on a completion
                    transaction.",
                    "-1 indicates that the IP does not issue completions.",
                    "0 indicates that IP does not issue completions with
                    data"
                ],
                "RANGE": "-1:1024",
                "REQUIRED": "1",
                "TYPE": "INTEGER",
                "VALUE": "2"
            },
            "DRIVES_MAX_PAYLOAD_NP": {
                "DESCRIPTION": [
                    "The maximum number of DWORDS on a non-posted
                    transaction.",
                    "-1 indicates that the IP does not issue non-posted
                    transactions."
                ],
                "RANGE": "-1:1024",
                "REQUIRED": "1",
                "TYPE": "INTEGER",
                "VALUE": "0"
            },
            "DRIVES_MAX_PAYLOAD_P": {
                "DESCRIPTION": [
                    "The maximum number of DWORDS on a
                    posted transaction.",
                    "-1 indicates that the IP does not issue posted
                    transaction"
                ],
                "RANGE": "-1, 1:1024",
                "REQUIRED": "1",
                "TYPE": "INTEGER",
                "VALUE": "64"
            },
            "DRIVES_MAX_READ_REQ": {
                "DESCRIPTION": "The Maximum size of read request in
                DWORDS for a read request on the egress interface.",
                "RANGE": "-1:1024",
                "REQUIRED": "1",
                "TYPE": "INTEGER",
                "VALUE": "64"
            },
            "RECEIVES_MAX_PAYLOAD_C": {
                "DESCRIPTION": [
                    "The maximum number of DWORDS on a completion
                    transaction.",
                    "-1 indicates that the IP does not issue completions.",
                    "0 indicates that IP does not issue completions with
                    data"
                ],
                "RANGE": "-1:1024",
                "REQUIRED": "1",
                "TYPE": "INTEGER",
                "VALUE": "64"
            },
            "RECEIVES_MAX_PAYLOAD_NP": {
                "DESCRIPTION": [
                    "The maximum number of DWORDS on a non-posted
                    transaction.",
                    "-1 indicates that the IP does not issue non-posted
                    transactions."
                ],
                "RANGE": "-1:1024",
                "REQUIRED": "1",
                "TYPE": "INTEGER",
                "VALUE": "2"
            },
            "RECEIVES_MAX_PAYLOAD_P": {
                "DESCRIPTION": "The maximum number of DWORDS on a
                posted transaction. -1 indicates that the IP does not issue posted
                transaction",
                "RANGE": "-1, 1:128",
                "REQUIRED": "1",
                "TYPE": "INTEGER",
                "VALUE": "2"
            },
            "RECEIVES_MAX_READ_REQ": {
```

TABLE 3-continued

```
    "DESCRIPTION": "The Maximum size of read request in
    DWORDS for a read request on the ingress interface.",
    "RANGE": "-1:1024",
    "REQUIRED": "1",
    "TYPE": "INTEGER",
    "VALUE": "2"
  },
  "ROOTSPACE": {
    "DESCRIPTION": "Set up the root space for this payload
    signals. -1 indicates that the IP is RS unaware",
    "RANGE": "-1:7",
    "REQUIRED": "1",
    "TYPE": "INTEGER",
    "VALUE": "0"
    }
  }
],
```

Figure 7:
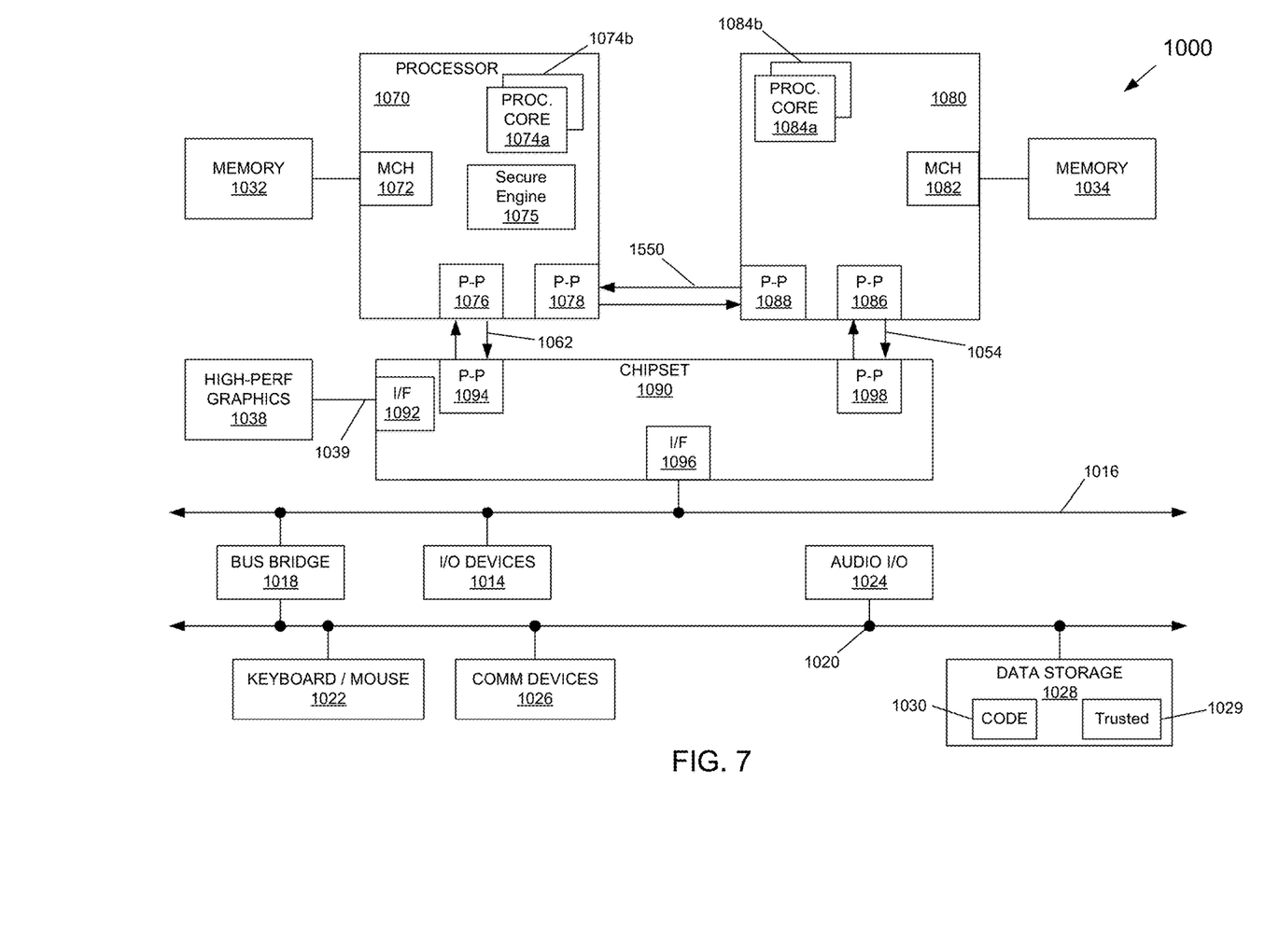
FIG. 7 is a block diagram of a design tool in accordance with another embodiment of the present invention.

Referring now to FIG. 7, shown is a block diagram of a design tool in accordance with another embodiment of the present invention. System 1000 may be configured to perform the controllable automatic, semi-automatic, and/or manual derivation of PSF parameters as described herein. As shown in FIG. 7, multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074b and processor cores 1084a and 1084b), although potentially many more cores may be present in the processors.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030 such as derivation code for execution by the design tool, in one embodiment. As further seen, data storage unit 1028 also includes a trusted storage 1029 to store sensitive information to be protected, such as SoC information and IP metadata files. Further, an audio I/O 1024 may be coupled to second bus 1020.

The following Examples pertain to further embodiments.

In an example, a method comprises: receiving, in a design tool, SoC information regarding a SoC undergoing a design process, the SoC to comprise a plurality of IP logics to be interconnected by at least one fabric; receiving, in the design tool, a plurality of IP data files for the plurality of IP logics; creating a plurality of IP data models for the plurality of IP logics based at least in part on the plurality of IP data files; creating a topology data model based at least in part on the SoC information; and for a plurality of class of features of the at least one fabric, updating the topology data model according to one of a plurality of derivation algorithms, to form an intermediate representation of the at least one fabric as a processed topology data file.

In an example, the method further comprises performing at least one consistency check to ensure the SoC information and the plurality of IP data files are semantically and syntactically correct.

In an example, the method further comprises generating a connectivity graph for the SoC, where ports of the at least one fabric are represented by nodes and connections between the at least one fabric and one or more of the plurality of IP logics are associated with edges.

In an example, the method further comprises outputting the processed topology data file in at least one data format, to enable the at least one fabric to be fabricated within the SoC.

In an example, the SoC information includes clock information for a plurality of clocks to be incorporated into the SoC, mapping information to identify the plurality of IP logics to be incorporated into the SoC, and topology information to identify at least some requirements of the at least one fabric.

In an example, when the intermediate representation comprises an initial intermediate representation, updating the topology data model comprises autonomously selecting parameters for the plurality of class of features.

In an example, when the intermediate representation comprises a revised intermediate representation, updating the topology data model comprises, for at least some of the plurality of classes of features, updating at least some of the parameters for the at least some of the plurality of classes of features via user input.

In an example, the method further comprises enabling a user to select the one of the plurality of derivation algorithms to enable one of a fully automated formation of the intermediate representation of the at least one fabric, a partially automated formation of the intermediate representation of the at least one fabric, and a fully manual formation of the intermediate representation of the at least one fabric.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a design tool comprises: one or more processors to execute instructions; and a configuration logic to generate a configuration file for a fabric of an SoC to be designed by the design tool. The configuration logic, based at least in part on user input, may be configured to generate the configuration file, according to one of: automatic derivation of all parameters of the fabric, according to a first user selection; manual input by a user of at least some parameters of the fabric and automatic derivation of at least other parameters of the fabric, according to a second user selection; and manual input by the user of the all parameters of the fabric, according to a third user selection.

In an example, the SoC is to comprise a plurality of IP logics to be interconnected by the fabric, and the design tool is to receive SoC information regarding the SoC and a plurality of IP data files for the plurality of IP logics.

In an example, the configuration logic is to create a plurality of IP data models for the plurality of IP logics and create a topology data model based at least in part on the SoC information.

In an example, the design tool is, for each of a plurality of class of features of the fabric, to update the topology data model according to one of a plurality of derivation algorithms, to form an intermediate representation of the fabric comprising the configuration file.

In an example, the design tool is to generate a connectivity graph for the SoC, where ports of the fabric are represented by nodes and connections between the fabric and one or more of the plurality of IP logics is associated with edges.

In an example, the parameters of the fabric include an identification of one or more of the plurality of IP logics to be coupled to one or more ports of the fabric, channel mapping information between one or more channels of a first IP logic and one or more channels of a second IP logic, and buffer depth information for one or more buffers of the fabric.

In an example, the design tool is to output a representation of the configuration file in a plurality of output formats.

In an example, the design tool is to enable the user to override one or more parameters of the fabric derived via the configuration logic, during a revision to the configuration file after an initial generation of the configuration file.

In an example, the fabric is to include N parameters, and where the configuration logic is to automatically derive N-M parameters of the N parameters, where the user is to provide M parameters of the N parameters to the design tool.

In another example, a method comprises: receiving, in a computing system, SoC information regarding a SoC being designed, the SoC to comprise a plurality of IP logics to be interconnected by at least one primary scalable fabric; receiving, in the computing system, a plurality of IP data files for the plurality of IP logics; and creating a topology data model based at least in part on the SoC information and the plurality of IP data files, the topology data model including a plurality of parameters of the at least one primary scalable fabric, the plurality of parameters to be one of fully automatically derived in the computing system, partially automatically derived in the computing system, or fully manually provided to the computing system, according to user selection.

In an example, the method further comprises, for each of a plurality of class of features of the at least one primary scalable fabric, updating the topology data model according to one of a plurality of derivation algorithms, to form an intermediate representation of the at least primary scalable fabric.

In an example, the method further comprises receiving the SoC information including clock information for a plurality of clocks to be incorporated into the SoC, mapping information to identify the plurality of IP logics to be incorporated into the SoC, and topology information to identify at least some requirements of the at least one primary scalable fabric.

In another example, an apparatus for designing a SoC comprises: means for receiving SoC information regarding a SoC being designed, the SoC to comprise a plurality of IP logics to be interconnected by at least one primary scalable fabric; means for receiving a plurality of IP data files for the plurality of IP logics; and means for creating a topology data model based at least in part on the SoC information and the plurality of IP data files, the topology data model including a plurality of parameters of the at least one primary scalable fabric, the plurality of parameters to be one of fully automatically derived, partially automatically derived, or fully manually generated, according to user selection.

In an example, the apparatus further comprises means for updating the topology data model according to one of a plurality of derivation algorithms, to form an intermediate representation of the at least primary scalable fabric.

In an example, the means for receiving the SoC information is to receive clock information for a plurality of clocks to be incorporated into the SoC, mapping information to identify the plurality of IP logics to be incorporated into the SoC, and topology information to identify at least some requirements of the at least one primary scalable fabric.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory machine-readable storage medium having stored thereon instructions, which if performed by a design tool cause the design tool to perform a method comprising:
   receiving, in the design tool comprising one or more computer systems, system on chip (SoC) information regarding a SoC undergoing a design process, the SoC to comprise a plurality of intellectual property (IP) logics to be interconnected by at least one fabric;
   receiving, in the design tool, a plurality of IP data files for the plurality of IP logics;
   creating, in the design tool, a plurality of IP data models for the plurality of IP logics based at least in part on the plurality of IP data files;
   creating, in the design tool, a topology data model based at least in part on the SoC information;
   for a plurality of class of features of the at least one fabric, updating the topology data model according to one of a plurality of derivation algorithms, to form an intermediate representation of the at least one fabric as a processed topology data file, including enabling a user to select the one of the plurality of derivation algorithms to enable, for the class of features, one of a fully automated formation of the intermediate representation of the at least one fabric by the design tool, a partially automated formation of the intermediate representation of the at least one fabric by the design tool for one or more configuration parameters by the user and by the user for one or more other configuration parameters provided by the user, and a fully manual formation of the intermediate representation of the at least one fabric for a plurality of configuration parameters provided by the user; and
   outputting the processed topology data file in at least one data format, to cause the at least one fabric to be fabricated within the SoC.

2. The non-transitory machine-readable storage medium of claim 1, wherein the method further comprises performing at least one consistency check to ensure the SoC information and the plurality of IP data files are semantically and syntactically correct.

3. The non-transitory machine-readable storage medium of claim 1, wherein the method further comprises generating a connectivity graph for the SoC, wherein ports of the at least one fabric are represented by nodes and connections between the at least one fabric and one or more of the plurality of IP logics are associated with edges.

4. The non-transitory machine-readable storage medium of claim 1, wherein the SoC information includes clock information for a plurality of clocks to be incorporated into the SoC, mapping information to identify the plurality of IP logics to be incorporated into the SoC, and topology information to identify at least some requirements of the at least one fabric.

5. The non-transitory machine-readable storage medium of claim 1, wherein when the intermediate representation comprises an initial intermediate representation, and updating the topology data model comprises autonomously selecting parameters for the plurality of class of features.

6. The non-transitory machine-readable storage medium of claim 5, wherein when the intermediate representation comprises a revised intermediate representation, updating the topology data model comprises, for at least some of the plurality of classes of features, updating at least some of the parameters for the at least some of the plurality of classes of features via user input.

7. A design tool for designing a system on chip (SoC) comprising:
   one or more hardware processors to execute instructions; and
   a hardware configuration logic to generate a configuration file for a fabric of the SoC to be designed by the design tool, the SoC to comprise a plurality of intellectual property (IP) logics to be interconnected by the fabric, the design tool to receive SoC information regarding the SoC and a plurality of IP data files for the plurality of IP logics, the configuration logic to create a plurality of IP data models for the plurality of IP logics and create a topology data model based at least in part on the SoC information, wherein the design tool is, for each of a plurality of class of features of the fabric, to update the topology data model according to one of a plurality of derivation algorithms, to form an intermediate representation of the fabric comprising the configuration file, including enabling a user to select the one of the plurality of derivation algorithms to enable, for the class of features, based at least in part on user input, to generate the configuration file and output the processed topology data model in at least one data format, according to one of:
   automatic derivation of the intermediate representation of the fabric by the design tool, according to a first user selection;
   a partially automated formation of the intermediate representation of the fabric comprising manual input by a user of at least some parameters of the fabric and automatic derivation of at least other parameters of the fabric by the design tool, according to a second user selection; and
   a fully manual formation of the intermediate representation of the fabric comprising manual input by the user of all parameters of the fabric, according to a third user selection, wherein the configuration file is to cause fabrication of the fabric of the SoC.

8. The design tool of claim 7, wherein the design tool is to generate a connectivity graph for the SoC, wherein ports of the fabric are represented by nodes and connections between the fabric and one or more of the plurality of IP logics is associated with edges.

9. The design tool of claim 7, wherein the parameters of the fabric include an identification of one or more of the plurality of IP logics to be coupled to one or more ports of the fabric, channel mapping information between one or more channels of a first IP logic and one or more channels of a second IP logic, and buffer depth information for one or more buffers of the fabric.

10. The design tool of claim 7, wherein the design tool is to output a representation of the configuration file in a plurality of output formats.

11. The design tool of claim 7, wherein the design tool is to enable the user to override one or more parameters of the fabric derived via the configuration logic, during a revision to the configuration file after an initial generation of the configuration file.

12. The design tool of claim 7, wherein the fabric is to include N parameters, and wherein the configuration logic is to automatically derive N-M parameters of the N parameters, wherein the user is to provide M parameters of the N parameters to the design tool.

13. A method for designing a system on chip (SoC) comprising:
   receiving, in a computing system, system on chip (SoC) information regarding the SoC being designed, the SoC to comprise a plurality of intellectual property (IP) logics to be interconnected by at least one primary scalable fabric;

receiving, in the computing system, a plurality of IP data files for the plurality of IP logics; and creating, in the computing system, a topology data model based at least in part on the SoC information and the plurality of IP data files, the topology data model including a plurality of parameters of the at least one primary scalable fabric, the plurality of parameters to be one of fully automatically derived in the computing system, partially automatically derived in the computing system for some of the plurality of parameters and manually provided to the computing system, according to user selection for others of the plurality of parameters, or fully manually provided to the computing system, according to user selection, for each of the plurality of parameters, comprising for each of a plurality of class of features of the at least one primary scalable fabric, updating the topology data model according to one of a plurality of derivation algorithms, to form an intermediate representation of the at least one primary scalable fabric, including enabling a user to select the one of the plurality of derivation algorithms to enable, for the class of features, one of a fully automated formation of the intermediate representation of the at least one primary scalable fabric by the computing system, a partially automated formation of the intermediate representation of the at least one primary scalable fabric by the computing system for one or more configuration parameters and by the user for one or more other configuration parameters provided by the user, and a fully manual formation of the intermediate representation of the at least one fabric primary scalable for a plurality of configuration parameters provided by the user; and outputting the processed topology data model in at least one data format, to cause the at least one primary scalable fabric to be fabricated within the SoC.

14. The method of claim 13, further comprising receiving the SoC information including clock information for a plurality of clocks to be incorporated into the SoC, mapping information to identify the plurality of IP logics to be incorporated into the SoC, and topology information to identify at least some requirements of the at least one primary scalable fabric.

* * * * *